(12) United States Patent
Shaw et al.

(10) Patent No.: US 7,739,432 B1
(45) Date of Patent: Jun. 15, 2010

(54) COMMAND SWITCHING FOR MULTIPLE INITIATOR ACCESS TO A SATA DRIVE

(75) Inventors: Keith Shaw, Port Coquitlam (CA); Heng Liao, Belcarra (CA); Larrie Simon Carr, Nelson (CA); Nicolas Kuefler, Port Moody (CA)

(73) Assignee: PMC-Sierra, Inc., Santa Clara (US)

( * ) Notice: Subject to any disclaimer, the term of this patent is extended or adjusted under 35 U.S.C. 154(b) by 127 days.

(21) Appl. No.: 11/470,078

(22) Filed: Sep. 5, 2006

Related U.S. Application Data

(60) Provisional application No. 60/713,325, filed on Sep. 2, 2005, provisional application No. 60/713,326, filed on Sep. 2, 2005, provisional application No. 60/713,327, filed on Sep. 2, 2006, provisional application No. 60/723,446, filed on Oct. 5, 2005.

(51) Int. Cl.
*G06F 13/12* (2006.01)
*G11B 20/14* (2006.01)
*G11C 5/08* (2006.01)

(52) U.S. Cl. .............. 710/74; 360/44; 365/70
(58) Field of Classification Search ............ 710/74; 360/44; 365/70
See application file for complete search history.

(56) References Cited

U.S. PATENT DOCUMENTS

| | | | |
|---|---|---|---|
| 5,504,882 A * | 4/1996 | Chai et al. ............... 714/5 |
| 6,141,709 A * | 10/2000 | Cutter ...................... 710/100 |
| 6,792,486 B1 | 9/2004 | Hanan et al. |
| 7,047,335 B2 * | 5/2006 | Schauer et al. ............ 710/105 |
| 7,162,604 B1 * | 1/2007 | Nourmohamadian et al. .... 711/168 |
| 7,206,875 B2 * | 4/2007 | Marushak et al. .......... 710/62 |
| 2004/0252672 A1 | 12/2004 | Nemazie |
| 2004/0252716 A1 | 12/2004 | Nemazie |
| 2005/0160251 A1 * | 7/2005 | Zur et al. ................... 712/1 |

\* cited by examiner

*Primary Examiner*—Henry W. H. Tsai
*Assistant Examiner*—Juanito C Borromeo
(74) *Attorney, Agent, or Firm*—Leslie A. Kinsman; Borden Ladner Gervais LLP

(57) ABSTRACT

A multi-port switch and a method of command switching using such a switch. Multiple virtual targets provide multiple hosts with access to the physical target device attached to the target interface of the switch. The switch intelligently dispatches operations received by the virtual targets to the physical storage target device to provide shared access. In doing so, the communication between the switch and the physical target can fully comply with the SATA protocol without the physical target being aware that the operations have originated from multiple physical hosts, and without the multiple physical hosts being aware of the shared nature of the physical SATA target device.

39 Claims, 12 Drawing Sheets

COMMAND SWITCHING FOR MULTIPLE INITIATOR ACCESS TO A SATA DRIVE

CROSS-REFERENCE TO RELATED APPLICATIONS

This application claims the benefit of priority of U.S. Provisional Patent Application No. 60/713,327 filed Sep. 2, 2005, U.S. Provisional Patent Application No. 60/713,325 filed Sep. 2, 2005, U.S. Provisional Patent Application No. 60/713,326 filed Sep. 2, 2005, and of U.S. Provisional Patent Application No. 60/723,446 filed Oct. 5, 2005, which are incorporated herein by reference in their entirety; and is related to co-pending U.S. application Ser. No. 11/470,112, entitled "APPARATUS FOR INTERCONNECTING HOSTS WITH STORAGE DEVICES", and co-pending U.S. application Ser. No. 11/470,042, entitled "METHOD OF RATE SNOOPING IN A SAS/SATA ENVIRONMENT", the contents of which are incorporated herein by reference in their entirety.

FIELD OF THE INVENTION

The present invention relates generally to storage networks. More particularly, the present invention relates to switches and multi-ported devices that emulate multiple independent virtual devices using one or multiple storage target devices as storage media for, such as for use in Serial-Attached-SCSI (SAS) and Serial ATA (Advanced Technology Attachment) topologies.

BACKGROUND OF THE INVENTION

Serial ATA (SATA)-compliant devices, such as SATA hard disk drives and other SATA storage devices, are widely used in the consumer personal computer (PC) industry. The SATA specification generally describes a point-to-point interface between a host computer and an ATA device. Due to the large volumes driven by the consumer PC industry, SATA drives provide large storage capabilities at decreasing prices. However, SATA drives have only a single port for connecting to a single host, and the SATA architecture only supports one host with the ATA command set. This is acceptable in consumer PC applications, which do not typically require redundant architectures. In applications, such as storage networks for server-based and storage array-based applications, that require redundant data storage and/or access, a redundant array of independent drives (RAID) and/or a SAS system can be used.

SAS systems can maintain redundant access paths to storage devices, and are widely deployed in storage networks due to their performance and reliability. The SAS standard specifies a protocol stack that provides a serial physical interconnect that can be used to connect target devices and hosts together. It specifies the transport layer protocols, transport small-computer system interface (SCSI) commands, Serial ATA tunneling and management commands used to communicate between hosts and storage devices. The protocol is intended to be used in conjunction with SCSI and ATA command sets, as it reuses the physical interface of the SATA specification.

The SAS standard defines three basic components: initiators (or hosts), expanders, and targets (or peripheral devices, such as storage devices). SAS system components can include SAS hosts, SAS expanders, SAS devices, SATA drives, SATA port selectors and SATA port multipliers. The sum of all components used in a SAS implementation is known as the SAS domain. Initiators may be provided as an on-board component of a motherboard, or through the use of an add-on host bus adapter (HBA). Expanders are part of the service delivery subsystem and facilitate communication between SAS components. Generally, SAS expanders provide switching and routing functions to the SAS system components connected to them. SAS expanders allow multiple SAS components to be connected together to form a SAS topology. By creating two independent topologies, redundant paths between the SAS system components can be created.

As noted above, a SATA drive can be considered a SAS system component, as SAS expanders are capable of converting the tunneled SATA protocol (SATA Tunneled Protocol or STP) received from a host into a SATA serial interface compatible with a SATA drive. Due to their single-ported nature, SATA drives can only be directly connected to a single SATA host. To provide multiple hosts access to a single SATA drive, the drive can be connected to a SAS expander and then be available in a SAS topology. However, when connected to a SAS expander, the SATA drive can still only respond to one host at a time, requiring the hosts to coordinate access with each other. This process is inefficient. In addition, since a SATA drive can only be connected to a single SAS expander, that single expander becomes a non-redundant point of failure.

To address this, the SAS standard supports the use of a SATA port selector in a SAS topology. The port selector can connect to a SATA drive and to two SAS expanders, but, because the SATA drive is unaware that it is being accessed by two hosts, the hosts must coordinate their communication with the SATA drive. Since the ATA command set used by SATA drives is designed for a single host, a host must complete a desired operation with the SATA drive before relinquishing the drive to the other host. In other words, the host must ensure that the SATA drive is in an idle state before the port selector changes state. The port selector state is generally controlled by either side-band or protocol-based methods. Side-band methods require one or more electrical signals to be transmitted from the hosts to the port selector. Specific events, such as a rising edge on one of the signals, communicate to the port selector that it should change state. Protocol-based methods use a pattern of out-of-band (OOB) events to communicate a state change. SATA port selectors allow 2 hosts to share access to a SATA drive. However, SATA port selector only provides hosts with alternating, but still exclusive, access to the SATA drive. Storage applications are efficient if hosts are able to issue commands in close succession, and have the target receive and respond to those commands in a timely manner. While the use of SATA port selectors provides alternating access and redundancy, they do not provide concurrent access for multiple hosts and therefore detrimentally affects the system performance as it is wasteful of resources.

In addition to their single port limitation, SATA drives did not originally support command queuing, while SAS devices support Tagged Command Queuing. The SATA II specification extended the original SATA specification by defining a simple and streamlined command queuing model for SATA drives. This Native Command Queuing (NCQ) increases performance of SATA drives by allowing the individual device to receive more than one request at a time and decide which to complete first. For example, using detailed knowledge of its own seek times and rotational position, a SATA hard disk drive can compute the best order in which to perform input/output (I/O) operations. This can reduce the amount of unnecessary seeking of the drive's heads, resulting in increased performance and decreased wear, particularly for server-type applications where multiple simultaneous read/write requests are often outstanding. The SATA II specification provides a mechanism to identify these commands by a queue tag in a manner that is compatible with the original SATA specification. However, NCQ commands must still be issued as a contiguous series of frames to and from the target. This poses a problem for two hosts independently seeking access to a SATA drive.

Relying upon hosts to coordinate access to a single device causes difficulties on a number of levels. On one level, it removes the transparency of conventional SAS topologies, and requires that hosts interact with each other to coordinate drive access in real time. In a simple configuration, this may be possible, but causes problems if more than two hosts contend for a single SATA drive. Multiple hosts attempting to gain exclusive access to a single SATA target will experience long wait times for each request, which would not happen if they had simultaneous access. Further delays are caused during the switch over event as control of the drive passes from one host to another. These factors detrimentally impact system performance. On another level, coordination may require that hosts have knowledge of the configuration of a device, and base their access to the device on that knowledge. This makes replacing the drive with another device more difficult at a later date. As well, the coordination must handle error conditions such as when the device owner fails and/or disappears unexpectedly.

Therefore, it is desirable to provide a means within a SAS topology to permit multiple initiator access to a SATA drive without host interaction or contention issues.

SUMMARY OF THE INVENTION

There is provided a multi-ported apparatus designed to allow two or more hosts to concurrently access a target device, for example a storage device. The apparatus includes a host interface for interfacing with hosts, and a target device interface for communicating with target devices, for example storage drives. The interfaces are flexible in design, so that the apparatus is capable of communicating with either a SAS or SATA device. For example, the switch can operate so as to appear as a SAS device to a SAS host, and can also operate so as to appear as a SATA host when connecting to a SATA device.

Advantageously a host can communicate as if connected directly to a drive, without any modifications needed at the host or drive. For example, the apparatus can communicate with one of a number of connected hosts using a SAS protocol while being connected to a SATA drive via its storage device interface. In this example, the SATA drive will operate as if it is connected to a SATA host, whereas each SAS host will operate as if connected to a SAS device, preferably in a seamless fashion.

Embodiments of the invention provide a multi-port switch; a method of command switching; and a method of emulating a target device for multiple hosts by presenting an independent instance of a virtual device to each host interface, each having the functionality of the emulated physical target device. The switch provides each host with concurrent access to the target device in the sense that each host communicates with their virtual target device without knowledge of either the switch, or the shared nature of the target device. In other words, each host can operate independently and communicate with their corresponding virtual target device without causing interference to the operation of the other host/virtual target device pair.

The switch provides hosts with concurrent access to a device by receiving and buffering commands as they arrive, and then executes an intelligent command switching function for interleaving and transmitting the commands to the device. The communication between the switch and the physical target device complies with the protocol supported by the device so that no modifications are needed for the physical target, which is not aware that the operations have originated from multiple physical hosts.

Hence the communication between the host and virtual target devices, and between the switch with the physical target is considered to be fully transparent, both for normal command execution, as well as for error indicator propagation and error recovery procedure. This transparency enables the switch to be used in SAS/SATA systems without modification to the surrounding components in the system including the host/initiator devices, SAS expander devices, and target devices (e.g., disk drives). For example, a SATA drive attached to the switch is unaware that it is being accessed by more than one host.

One skilled in the art will appreciate that the apparatus is not required to terminate all traffic, and instead can terminate a subset of the traffic. The termination of a subset of traffic from host allows the interface switch to take action on terminated commands. The action taken can include the dropping of a command, forwarding of the command, modification of the command prior to forwarding, or other processor controlled actions, such as putting the command into a queue and deferring forwarding of the command to a later time, based on, for example, scheduling policies and/or the state of the multiple host and target interfaces. When traffic pertaining to a feature not fully supported by the target device is received from a host, it can be acted upon by the interface switch to provide a simulation of the feature. In one embodiment, target drives that do not respond to spin up and spin down commands, and instead spin as long as they are supplied with power, can be controlled to spin down upon receipt of spin down commands by having the interface switch control the power applied to the drive.

In particular embodiments, the interface switch can include a general purpose input/output interface for communication signals, for example to update software stored in the switch memory, for device configuration and control, and to support various features. Examples of these communication signals include device power control signals, status information or control signals for an external display.

More particularly, the present invention provides a method and system for arbitrating access to a single SATA drive, or target, between multiple hosts. Embodiments of the invention provide a multi-port switch and a method of command switching. The multi-port switch and the method of command switching can be used in a SAS/SATA topology to interconnect multiple SAS hosts to the SATA drive. Embodiments of the switch according to the present invention implement intelligent switching algorithms that break or group SATA FIS exchanges into atomic sequences, and switch the atomic sequences among the target port and the multiple host ports. An atomic sequence is a single logical operation between one host and the SATA target, and can include one or more FIS exchanges. Atomic sequences from multiple hosts can be interleaved with each other. Atomic sequences can be identified by tracking Frame Information Structure (FIS) transactions between one host and the SATA target, and switching decisions are made at the boundary of the atomic sequences. The present invention also provides means to track Native Command Queuing (NCQ) FIS exchanges within atomic sequences, and to modify the queuing tags and the status to ensure that the tags used by the two hosts do not overlap with each other from the SATA target's perspective.

In a first aspect, in a switch device that supports concurrent communication between multiple hosts and a target device, the present invention provides a method of providing transparent access to the target device to each of the multiple hosts. The method comprises emulating an independent virtual target for each host interface, and maintaining independent frame buffers, command queues, and context databases for each of the virtual targets.

In a further aspect, the present invention provides a multi-ported switch. The switch comprises a plurality of host interfaces for receiving frames from a respective plurality of hosts; a processor including a FIS analyzer for detecting FIS's within the frames, each FIS containing at least one SATA command, and an atomic sequence detector for identifying atomic sequences, each atomic sequence comprising a set of SATA commands to invoke a single logical operation; a memory, including a buffer to store the identified atomic sequences; and a SATA target interface to transmit selected atomic sequences.

In yet another aspect, the present invention provides a method of command switching between a plurality of hosts and a SATA target device in a SAS topology. The method comprises receiving frames destined to one of the plurality of hosts or the target device, the frames each including a Frame Information Structure (FIS) having at least one command stored therein; analyzing each FIS to identify atomic sequences, each atomic sequence comprising commands to invoke an indivisible logical operation; selecting one of the atomic sequences for transmission to its destined host or a virtual target associated with the target device; and transmitting the selected atomic sequence.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached figures, wherein.

DETAILED DESCRIPTION

Figure 1:
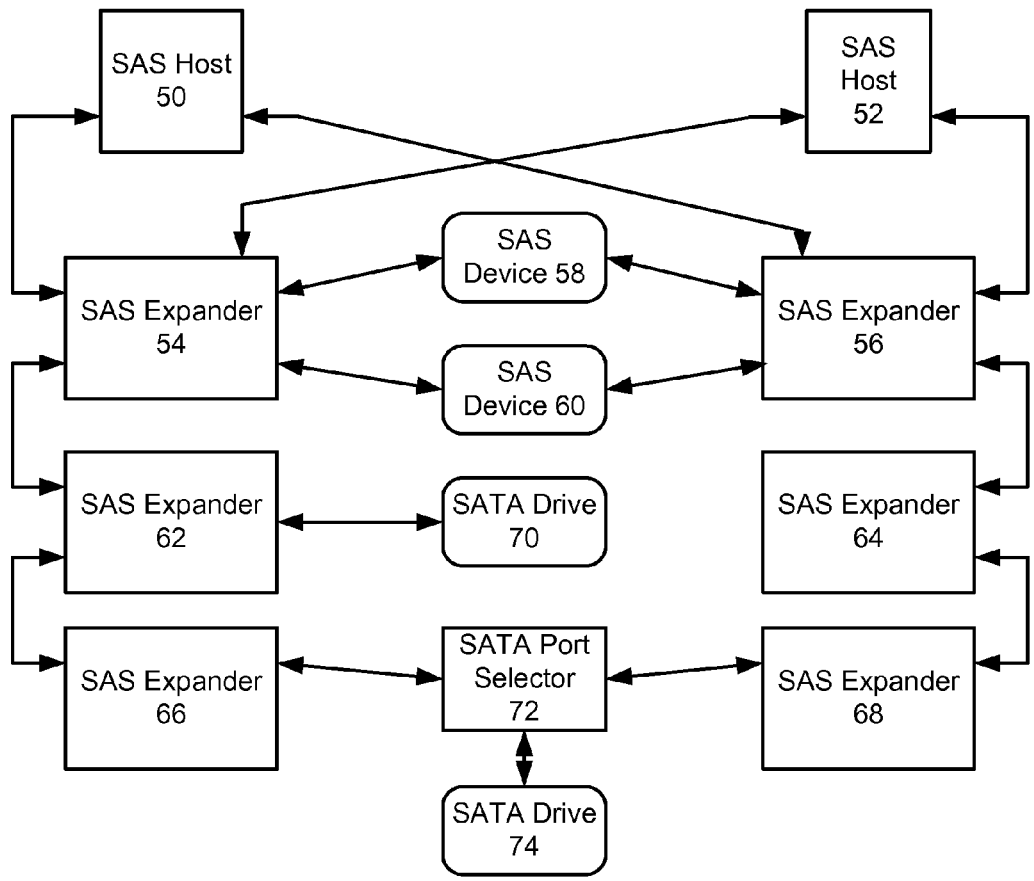
FIG. 1 shows a prior art SAS/SATA topology.

FIG. 1 illustrates an exemplary prior art SAS topology for a storage network, incorporating SAS hosts, SAS expanders, SAS devices and SATA drives. Each of SAS hosts 50 and 52 are connected to SAS expanders 54 and 56. In turn, both expander 54 and expander 56 are connected to dual-ported SAS storage drives 58 and 60. Expander 54 is directly connected to expander 62, which is connected to expander 66. Expander 56 is similarly connected to expander 64, which in turn is connected to expander 68. Expander 62 also serves as a single point of connection to SATA drive 70. Expanders 66 and 68 connect to SATA port selector 72, which in turn provides them with a connection to SATA drive 74.

By providing redundant data paths between elements, a SAS topology increases the reliability of the storage network. If a single element in the SAS topology, including the links between elements, becomes unavailable, a path still remains between the SAS host devices 50 and 52 and any of the SAS devices 58 and 60 and SATA port selector 72. Only failure of two elements or failure of a device itself will render a storage device inaccessible.

As previously noted, both SAS devices and SATA drives can be attached to a SAS expander. When a SATA drive is connected to a SAS expander, a host will issue SATA commands to the SATA drive using STP, such that nodes in the SAS topology see only SAS data. The expander converts the STP data into SATA commands and transmits them over a serial interface to the SATA drive.

The simplest manner in which a SATA drive can be connected into the storage network is through a direct connection to an expander, as shown by the connection of expander 62 to SATA drive 70. When a SATA drive is connected in this manner, SAS hosts within the same topology must coordinate access to the SATA drive using a SAS affiliation within the SAS expander. An affiliation is essentially a semaphore that allows one host to lock access to a SATA drive until it is finished with the device. The host must ensure the SATA drive is in an idle state before clearing the affiliation. Although drive 70 is connected to both SAS hosts through expander 62, it can only be accessed by a single host at any given time. Expander 62 tracks the ownership of the SATA drive using the SAS affiliation within the SATA Tunneled Protocol (STP) bridge function within the expander. This connection provides both SAS hosts 50 and 52 with access to the drive, but it is still a singly connected drive. If expander 62, expander 54, the connections between these expanders, the connections between expander 54 and either of the SAS hosts 50 and 52, or the connection between expander 62 and the SATA drive 70 fail, the connection between the SAS hosts and the drive becomes unavailable. Thus, direct connection of SATA drive reduces the cost of a storage network, but does so at the cost of the redundancy provided by a dual-ported connection.

To address this lack of redundancy, a SATA port selector, such as SATA port selector 72, can be used to connect expanders 66 and 68 to SATA drive 74. This provides a redundant path to SATA drive 74, but requires that the hosts coordinate their communication with the SATA drive.

Embodiments of the invention provide a multi-port switch, a method of command switching, and a method of using virtual targets emulating a physical SATA storage device that have the full functionality of a physical storage device and present a fully independent instance of the device to each host interface. Each host device can independently operate with its corresponding peer virtual target without causing interference with the operation of other host/virtual target pairs. The host communicates with the virtual target without knowledge of the existence of the switch, nor the shared nature of the physical target device. The multiple virtual targets provide the hosts with access to the physical target device attached to the target interface of the switch. This physical target device is used as a common storage medium. The switch intelligently dispatches operations received by the virtual targets to the physical storage target device to provide shared access. In doing so, the communication between the switch and the physical target can fully comply with the SATA protocol without the physical target being aware that the operations have originated from multiple physical hosts, and without the multiple physical hosts being aware of the shared nature of the physical SATA target device. Hence the communication between the host and virtual target pair, and the switch and the physical target, are considered to be fully transparent both for normal command execution, as well as for error indicator propagation and error recovery procedures. This transparency enables the switch to be used in SAS/SATA systems without modification to the surrounding components in the system including the host/initiator devices, expander devices, and storage target (disk) devices.

When a SATA storage target device is attached to the target interface of the switch, the switch can detect the type of host device attached. According to various embodiments of the invention, when the host device type is SATA, the switch can determine to emulate one SATA virtual device for each host interface; whereas, when the host device type is SAS (initiator or expander device) the switch can emulate one SATA virtual target device for each host interface. In other embodiments, the switch can emulate one SAS-STP (SATA Tunneled Protocol) virtual target device per host interface.

Figure 2:
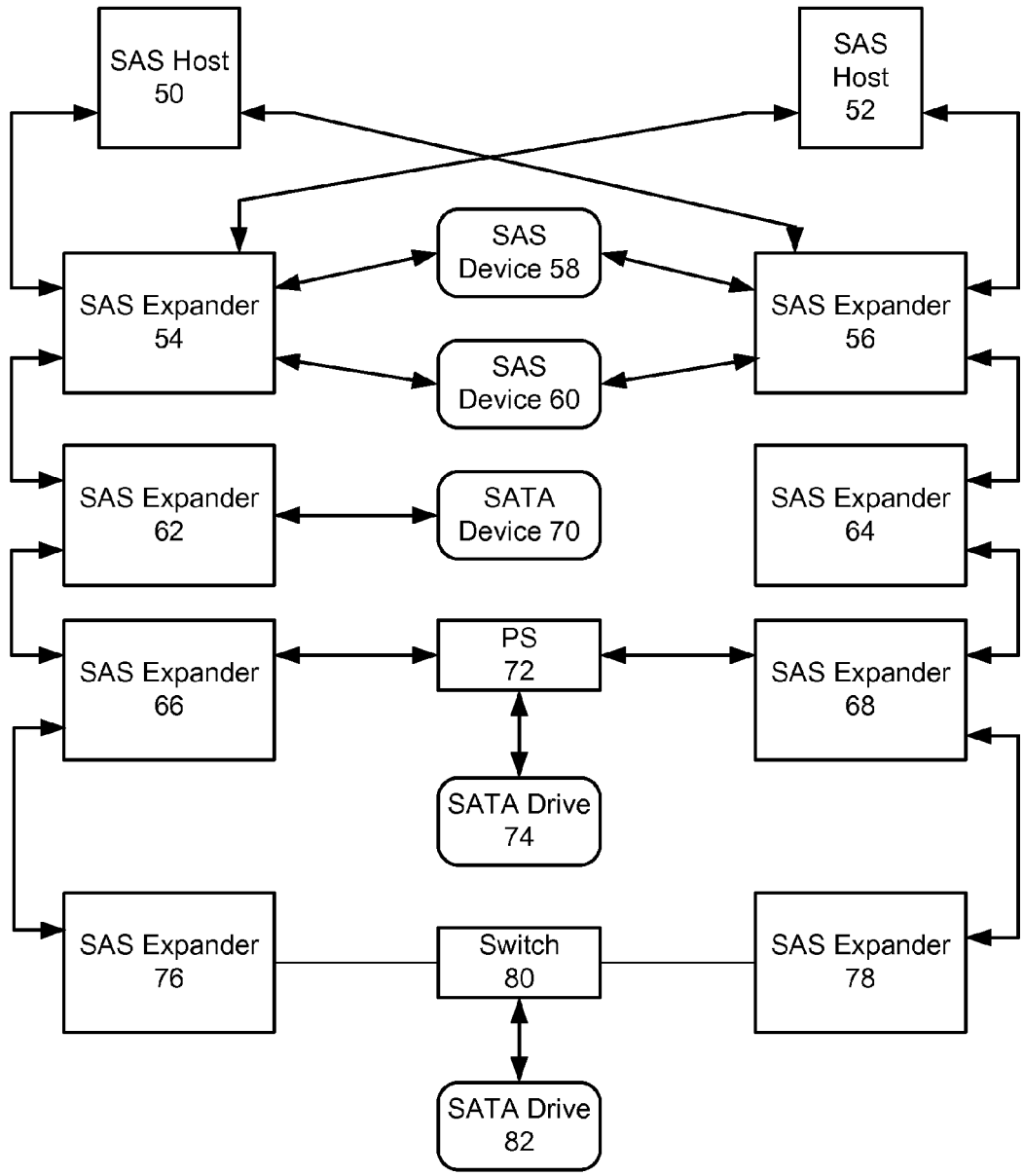
FIG. 2 shows a SAS/SATA topology according to an embodiment of the present invention.

FIG. 2 illustrates an embodiment of the present invention in a SAS/SATA topology. The SAS/SATA topology is identical to that of FIG. 1, but adds expander 76 connected to expander 66, and expander 78 connected to expander 68. These SAS expanders connect to a multi-ported switch 80 according to the present invention. Switch 80 performs command switching between the accessing hosts to provide transparent and concurrent access to SATA drive 82. Advantageously, the hosts do not need to co-ordinate their communication with the SATA drive. Therefore, the hosts can operate as if they had a single connection to the SATA drive 82. According to the present invention the switch emulates a virtual target device per host interface. As will be apparent to those of skill in the art, switch 80, while depicted as a separate element within the SAS/SATA topology, can be embedded in existing devices, such as SAS expanders.

According to the present invention, SATA command transactions are broken into atomic sequences. As used herein, an atomic sequence is a FIS exchange that defines a single logical operation between one of the hosts and the target SATA device. An atomic sequence is a sequence of FIS's for data, command, and/or status operations, that can be interleaved with atomic sequences destined to or originating from multiple virtual targets and hosts. Atomic sequences can be exchanged, interleaved, terminated and originated at their boundaries by the switch. The start and end of an atomic sequence are the boundaries. As used herein, a FIS exchange is a sequence of one or more FIS's that together form a higher level transport layer or command layer action. A FIS transaction is the link layer handshaking required to transmit/receive a FIS. Each atomic sequence is a set of one of more commands that have been determined by the switch to be necessary to perform together or that invoke a single logical function or logical operation. An atomic sequence is communicated as a single unbroken series, or exchange, of FIS's, without interleaving with other commands. An atomic sequence can contain multiple FIS's, but it should be noted that several types of commands, including NCQ (Native Queuing Command) commands, can be broken into a series of atomic sequences. In some cases, access to the SATA drive is provided by switching between the atomic sequences; in other cases, a sequence is terminated by the switch and stored, or temporarily buffered, on a per virtual target basis into queued structures, buffers, or a command context database of the affected virtual target. The buffered atomic sequence can then be modified, regenerated, or originated at a later time for shared access to the physical target. The switch 80 can be provided with suitable intelligence to determine when a buffered atomic sequence can be discarded, modified or reordered, in accordance with other atomic sequences transmitted to or from its destined host, or in accordance with a status or error condition of either the host or the target.

Access to the SATA drive 82 is provided to both hosts 50 and 52 by switching between the atomic sequences. The switch 80 can identify the start and end of atomic sequences as they pass through the switch, and can originate and terminate atomic sequences to both hosts and the target. For example, the switch can terminate multiple NCQ command issue atomic sequences from the hosts by buffering them, and then source them to the target at the appropriate time. Atomic sequences can also be modified by the switch 80 prior to transmission to either the hosts or the target SATA drive. According to an embodiment of the present invention, the switch 80 identifies the atomic sequences by tracking or analyzing FIS transactions to find the start and end of atomic sequences, and makes switching decisions at the boundary of atomic sequences. The switch can also track the NCQ FIS exchanges within the atomic sequences to modify the queuing tags and switch buffer status to ensure that the tags used by the two hosts do not overlap with each other from the perspective of the attached target SATA device.

Figure 3:
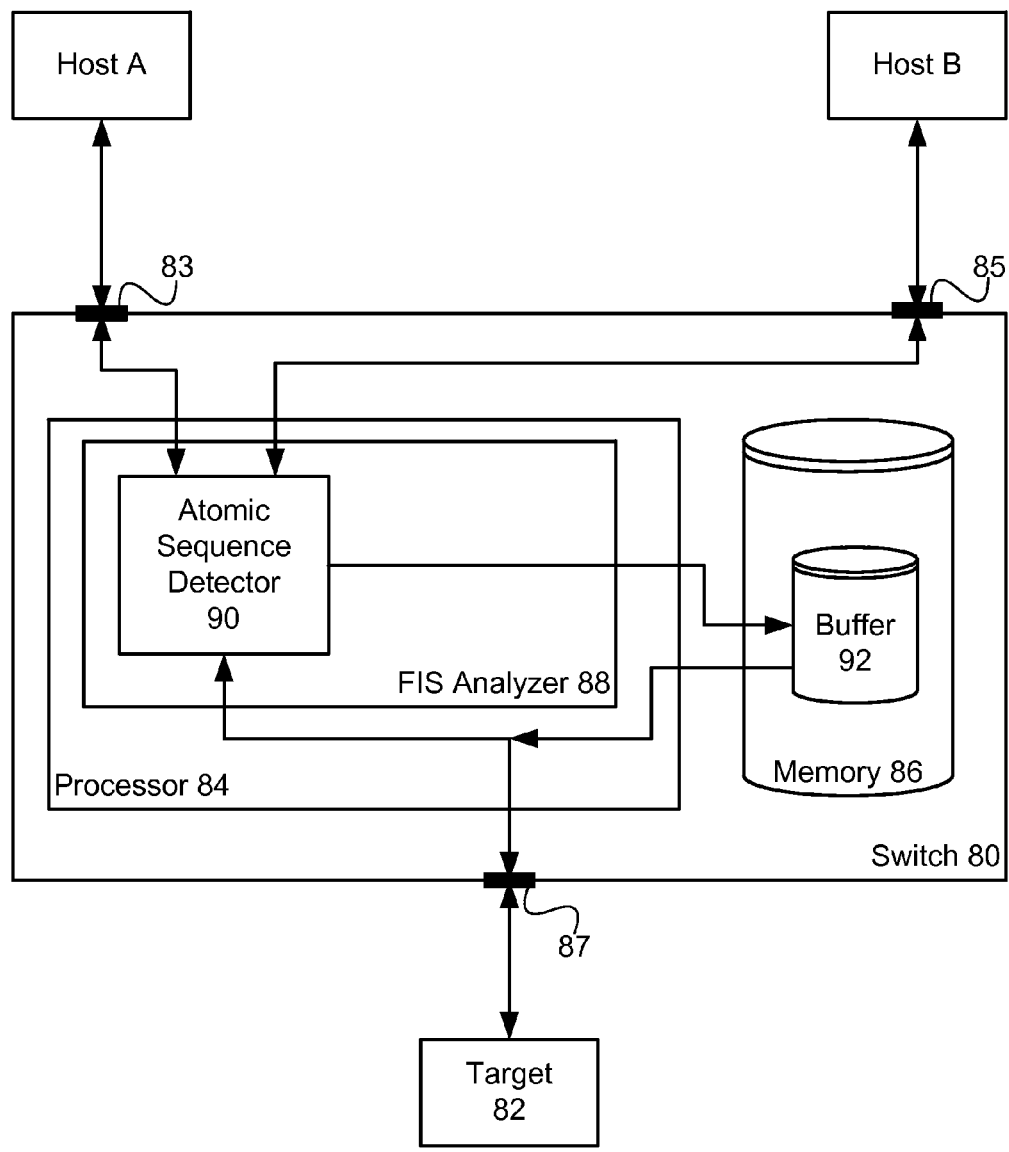
FIG. 3 shows a multi-ported SATA switch according to an embodiment of the present invention.

FIG. 3 illustrates an exemplary embodiment of a system of the present invention as a series of logical elements embodied in a physical system. Elements unrelated to the command switching function of the present invention are not illustrated in FIG. 3. However, as will be appreciated by those of skill in the art, the switch can be provided with additional functionality, such as the ability to detect and transmit SATA primitives, and originate and terminate proprietary FIS's. FIG. 3 will be discussed in conjunction with FIG. 4, which illustrates an embodiment of a command switching method according to the present invention.

Switch 80 connects to host A and host B through host ports 83 and 85 and provides both these hosts access to a target device, such as SATA drive 82, through a target port 87. As will be appreciated, hosts A and B are not necessarily directly connected to switch 82, but may be connected to the port through a series of intermediate connections. Access to a target device is provided through target port 87. The assignment of a physical port to the logical functions is performed by the processor 84, and thus, any physical port can be reassigned to serve as another port. While target port 87 can be used to access either a SAS device or a SATA drive, for the purposes of the present invention, a SATA drive is attached to target port 87. One skilled in the art will appreciate that switch 80 can have additional host ports without departing from the scope of the present invention. The current illustration has been limited to two ports only for the sake of simplicity, and this should not be construed as limiting to the scope of the present invention. Communication through target port 87 can be performed at various link speeds. Host ports 83 and 85 can be used to communicate with SATA initiator devices, SAS initiator devices and SAS expanders, which for the following discussion will be generically referred to as hosts.

An initial drive to host signature (D2H_REG) FIS generated by the SATA target can be buffered by the switch, so that when the host port is ready, the initial FIS can be sent to the host port without resetting the drive. Buffering the initial FIS ensures that both host ports can receive a copy of the drive to host signature FIS independent of the time when the host port is ready. In addition to the switch initially buffering this FIS, the switch can also track any atomic sequences where the signature FIS is re-transmitted by the target. One skilled in the art will appreciate that, in addition to buffering the signature FIS, it can also be modified by the switch to create a unique signature to that of the drive. The switch can then update its buffered copy with the latest drive to host signature FIS received from the target. For example, a new drive to host signature FIS may be transmitted after soft reset and execute device diagnostic commands. If a host port transmits a command prior to receiving the initial FIS, the switch can consider this to be an indication that the initial FIS is not required.

When a connected device (host or target) becomes active, identifying information must be provided. The process for identifying devices, and the creation of virtual targets for connection to hosts is further described in co-pending U.S. application Ser. No. 11/470,112, entitled "APPARATUS FOR INTERCONNECTING HOSTS WITH STORAGE DEVICES", the contents of which are incorporated herein by reference in their entirety.

Processor 84 can terminate FIS's received by a virtual target. These terminated FIS's can be modified by processor 84 prior to being transmitted on the target port. FIS's received from the target port can also be terminated by processor 84, and modified prior to transmission on one of the host ports. In one example of FIS modification and the use of a virtual target, a physical SATA drive may have 32 queue locations for commands. This queue can be equally divided between two virtual targets, so that each virtual target appears to have 16 queue locations. A mapping between each of the virtual target queue locations and the physical queue locations can be maintained by processor 84 in memory 86. When a FIS is received from a host, its queue location in the virtual target may be specified. This location is then modified so that it corresponds with the appropriate location in the queue of the physical device. This modification of FIS's is performed to provide transparent access to the physical drive through the logical construct of the virtual target. In the opposite direction, a FIS received from the drive may indicate the queue location of the command that it is in response to. This queue location in the physical drive can be used to determine the host that the FIS should be provided to. After remapping the physical queue location to the appropriate location in the queue of the virtual target, the modified FIS can be forwarded to the appropriate host, which will perceive it as having been transmitted by the appropriate virtual target. This example should be viewed as a simple example of a FIS modification. This is merely an example of how the switch 80 can maintain queue assignments, and should not be considered limiting. Queue assignments can also be, for example, maintained on a round-robin basis, first-come-first-served basis, etc. The switch can then, for example, make appropriate modifications to tags in the FIS's. Such modifications can be based on fixed or dynamic tag mapping, or any other means that permits appropriate remapping. One skilled in the art will appreciate that modification of FIS's in other exchanges may be handled in a different manner, dependent on the particular FIS in question. For example, a H2D_REG FIS can be modified for command issuing (tag assignment), a DMA_SETUP FIS can be modified for reverse tag mapping, a SDB FIS can be modified for to indicate completion, and a D2H_REG FIS can be modified for error indication. A DATA FIS can also be paused during an atomic sequence and its contents modified, if deemed appropriate by the switch. An example pausing and modifying a DATA FIS can, for example, occur when the data response to an IDENTIFY_DEVICE command passes through the switch.

It should be noted that interaction between a host and the virtual target that it is presented can operate independently of interactions between other host-virtual target pairings. The command switching method discussed elsewhere in this application provides each host concurrent access to the target through the interleaving of commands at the boundaries of identified atomic sequences. Because access is switched between active hosts, it is possible that commands sent by a host to its virtual target cannot be acted upon immediately. These commands can be queued in a command queue portion of buffer 92. They can then be modified/regenerated/re-originated at the switch prior to transmission to the target, when access to the target is provided by the command switching method. Because FIS's received from a host often have contextual relevance based on the order in which they are received, queued FIS's are preferably maintained in an ordered frame buffer by switch 80 on a per virtual target basis. The context of a FIS can be further maintained by processor 84 in a database stored in memory 86.

Although a single FIS analyzer 88 is illustrated, one skilled in the art will appreciate that the logical constructs created by processor 84 can be replicated on a per-virtual target basis if so desired. Such replication is not strictly necessary, and should not be viewed as limiting to the scope of the present invention. Similarly, buffer 92 used for both command queues and frame buffering, can be multiply instantiated so that it can exist on a per-virtual target basis, but need not be in all embodiments of the present invention.

Returning to FIG. 4, in step 94, frames are received from the hosts A and B over their respective host ports 85 and 87 or from the target 82 over its port 87. The received frames are provided to a FIS analyzer 88. The FIS analyzer includes an atomic sequence detector 90. The FIS analyzer 88 and atomic sequence detector 90 are both logical elements running on a microprocessor 84 through appropriate firmware. Logically, there is an independent FIS analyzer and atomic sequence detector for each virtual target operating in parallel on the host and target physical interfaces. FIS's within the received frames are located, and are analyzed to identify atomic sequences in step 96. The atomic sequence detector 90 can, for example, identify the beginning of an atomic sequence by locating and recognizing any information within the FIS, such as a SATA command.

In step 98, the processor 84 determines if the target device is available. This is typically done by transmitting a transmit ready (X_RDY) message to the target device, such as SATA drive 82. If the drive is ready, it will transmit a receive ready (R_RDY) message. Because SATA drives are given the highest priority in any contention situation, if the drive is not determined to be available in step 98, the FIS's associated with the atomic sequence are buffered at step 100. These FIS's are stored in buffer 92, which consumes a portion of memory 86. Frame buffers and command queues can be organized on a per virtual target basis. At this point an idle state is entered, until the target becomes available. Upon detecting, in step 98, that the target is available, an atomic sequence is selected in step 102 by processor 84. If there is an incoming atomic sequence, and no sequences are buffered, this selection typically entails selecting the incoming sequence. If each connected host is transmitting a sequence, one of the hosts is selected using an arbitration method, and the sequence received from that host is selected, while the other sequence is buffered as the target is unavailable to it. If the target is available, and atomic sequences are stored in buffer 94, one of the buffered atomic sequences is selected from the buffer. If a number of atomic sequences, associated to different hosts, are buffered, the switch 80 can also employ an arbitration method to make the selection. Any suitable arbitration method, such as a round-robin selection, or an unfair arbitration where one host is provided priority over the other, can be used. The details of the arbitration method are not essential to the operation of the present invention.

Once an atomic sequence has been selected, the switch 80 can begin transferring data to the target, either using a bypass connection between the host and the target, or from the buffered atomic sequences (step 104). As used herein, the term bypass connection is a connection from one host to the target, through a bypass port, that permits a series of one or more atomic sequences to be transmitted directly between the host and target. Bypass mode is typically controlled by a hardware module within the switch 80 to minimize the latency introduced by the FIS exchanges during the bypass periods. The switch 80 monitors the bypass connection, or other connection to the target, to look for a set of stop conditions when the connection between the host and the target is torn down. Stop conditions can include any unexpected event or condition detected by the switch, such as unexpected primitives, frames, error conditions, etc. In addition, as described below, the expiry of a bypass watchdog timer can provide a stop condition. The provision of a bypass connection is optional, and is not necessary to the operation of the present invention.

The manner in which the switch 80 determines that an atomic sequence has ended will depend on the particular type of atomic sequence being monitored. For example, the switch 80 can determine that an atomic sequence has ended upon receipt of a drive to host register (D2H_REG) FIS or host to drive register (H2D_REG) FIS indicating the successful completion of a transaction. For a NCQ data transfer transaction, the switch 80 can, for example, monitor the number of data bytes transmitted and compare them to the data transfer count observed in the originating Direct Memory Access setup (DMA SETUP) FIS. Once an atomic sequence is complete, switch 80 knows that a logical operation has completed, and that another logical operation can be started. Once the end of an atomic sequence has been detected, the switch 80 can select another atomic sequence for transmission to either host. Atomic sequences from multiple hosts can be interleaved, but no atomic sequence can be interrupted, because each host would have difficulty in maintaining an accurate image of the state of target drive 82.

Target 82 typically has its own queue memory for storing native command queuing (NCQ) commands. To provide a simplified mechanism to determine the origin of data returned from the drive, switch 80 can segment the queue memory so that each connected host makes use of its own partition of the queue. This is merely an exemplary mechanism and, as noted above, with respect to the maintenance queue assignment for each virtual target, queues can be maintained and allocated, and tagging can be provided, by any suitable means. For example, the simplified mechanism can be extended to more complex tag allocation among the multiple hosts. This can easily be extended to programmable host allocated tags or alternatively mapping the tags based off the commands being issued rather than a fixed mapping. In the case of the tags based on command being issued. A given tag could be allocated at the time of reception of a command and stored in the processor memory thus changing the tag mapping to/from a host on the fly. This could be, for example, advantageous in an architecture that supplies unbalanced command issuing between hosts. Thus, when target 82 sends data back to switch 80, switch 80 will know with which queue location the data is associated, and can then transmit the data back to the drive. To permit this, switch 80 can identify itself as a drive having similar properties to the connected target drive 82, but with a queue size modified in accordance with the particular queue assignment algorithm being implemented. FIS analyzer 88 then modifies FIS's sent to and from the drive so that the queue locations are mapped to the correct physical queue locations on data going to the drive, and to the correct logical queue locations on data going to the hosts.

Figure 5:
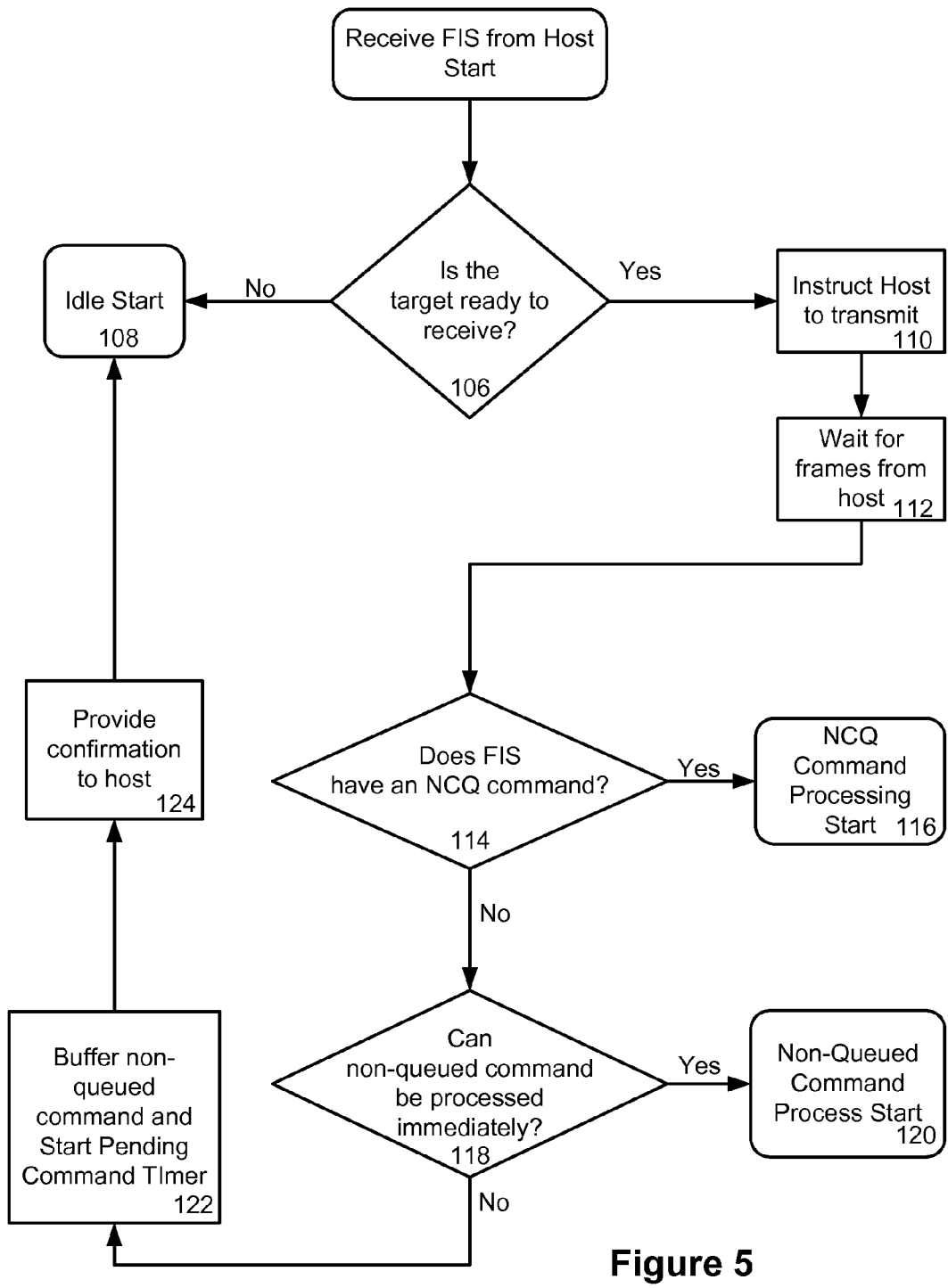
FIG. 5 is a flow chart of the processing of a FIS from a connected host according to an embodiment of the present invention.

FIG. 5 illustrates an exemplary embodiment of how switch 80 handles the receipt of a FIS from a connected host. Upon receipt of a frame containing a FIS, switch 80 determines, in step 106, whether or not target SATA drive 82 is in a receive ready state. This determination can be performed by informing the drive that the switch is ready to transmit (X_RDY), and waiting for a response. If the drive is ready to receive, it will provide the appropriate indication, such as R_RDY. If the drive is instead ready to transmit, it will indicate X_RDY. According to the SATA standard, SATA drives are given the highest priority, thus, if a drive is not ready to receive, switch 80 will proceed to the idle state in step 108. If switch 80 wins arbitration with SATA drive 82, it instructs the host to transmit in step 110, and then waits for the arrival of frames from the host in step 112. Upon receipt of frames from the host, a FIS in the frame is analyzed, in step 114, to determine if it contains an NCQ command. If the FIS contains a native command queuing (NCQ) command, NCQ command processing is begun in step 116. Otherwise, it is determined that the FIS contains a non-queued command. In step 118, a determination is made as to whether or not the non-queued command can be processed immediately. In many circumstances, non-queued commands cannot be immediately sent to the drive, as the drive will respond to them immediately. If a non-queued command, such as a soft reset is sent by one host, and is not delayed, it can preempt the execution of commands sent by the other host. If the non-queued command can be processed immediately, non-queued command processing is started in step 120. Otherwise, the non-queued command is buffered in step 122, and a timer is started to force the execution of the command within a defined period of time. Confirmation of the command, such as transmitting an R_OK primitive, is then provided to the issuing host in step 124, prior to entering the idle state in step 108. There may also be circumstances where there are outstanding NCQ commands within the drive that were issued by a separate host to that issuing the non-queued command. If the non-queued command were immediately forwarded to the drive, the NCQ commands would be aborted. To prevent this situation the device can employ graceful interleaving of non-queued commands with NCQ commands where the switch can wait for all issued NCQ commands to complete, while not issuing any further NCQ commands to the drive. Upon completion of the issued NCQ commands the non-queued command can be issued to the drive without causing NCQ error recovery on the other hosts.

When a determination is made that the command is a non-queued command in step 114, the command can immediately be considered an atomic sequence. If the command is determined to be an NCQ command, the atomic sequence is identified during the NCQ command processing.

Figure 6:
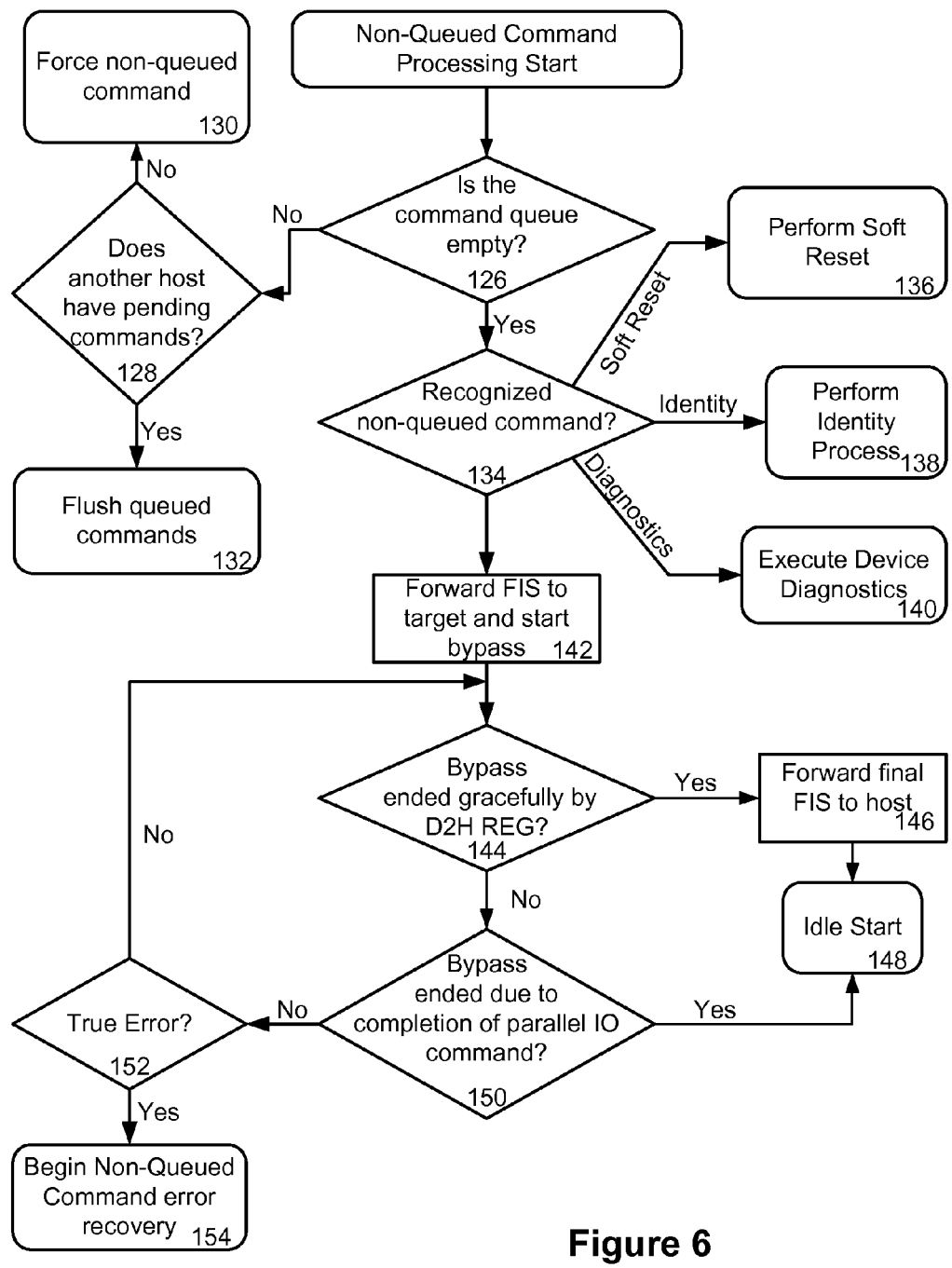
FIG. 6 is a flow chart of the processing of a non-queued command according to an embodiment of the present invention.

FIG. 6 illustrates the processing of a non-queued command, which, as discussed before, is treated as an atomic sequence. In step 126 the drive command queue is examined to determine if it is empty. If the command queue is not empty, a determination is made, in step 128, as to whether or not hosts other than the non-queued command issuing host have commands pending. If each host having access to the drive is allocated a portion of the command queue, this step can be as simple as determining if there are commands outside the portion allocated to the issuing host. If there are no queued commands associated with other hosts, the non-queued command is sent to the drive in step 130. If there are other commands, the drive is provided time to flush the pending queued commands in step 132, and the command is then forwarded to the drive.

If the command queue is determined to be empty in step 126, the command is inspected in step 134 to determine if it is a recognized command. Special handling routines can be created for certain commands. The processor and upgradeable firmware gives the ability to modify the functionality of the switch by creating additional handling routines, or modifying existing routines. If the command is recognized as a soft reset, an IDENTIFY_DEVICE command, or an EXECUTE_DEVICE_DIAGNOSTICS command, the relevant process is invoked in steps 136, 138 and 140, respectively. If the command is not on a recognized list of commands, the FIS is forwarded to the target and a bypass connection is established between the issuing host and the SATA drive.

When the bypass connection is terminated, the switch 80 determines if it was terminated gracefully (typically through a D2H_REG FIS) in step 144. If the bypass was terminated gracefully, the final FIS is forwarded to the host in step 146, and the idle process is started in step 148. If the bypass connection was not terminated with a D2H_REG FIS, it is determined whether or not the connection ended as a result of the completion of a parallel input/output command in step 150. If this is the case, the idle process is started in step 148, otherwise the error is examined in step 152. If, in step 152, it is determined that a D2H_REG FIS terminated the connection, and that the FIS indicates an error condition, non-queued command error recovery processes can be employed. Otherwise, it is assumed that the bypass connection is still underway, and the detection of the end of the bypass connection in step 144 was made in error. The process then returns to monitoring the bypass connection to determine when it ends. It should be noted that the operations transmitted through the bypass connection are an atomic sequence. At the conclusion of the non-queued command atomic sequence, the drive typically provides a D2H_REG FIS, by which the switch identifies the end of the atomic sequence and determines that other commands can be transferred to the drive if already buffered.

Figure 7:
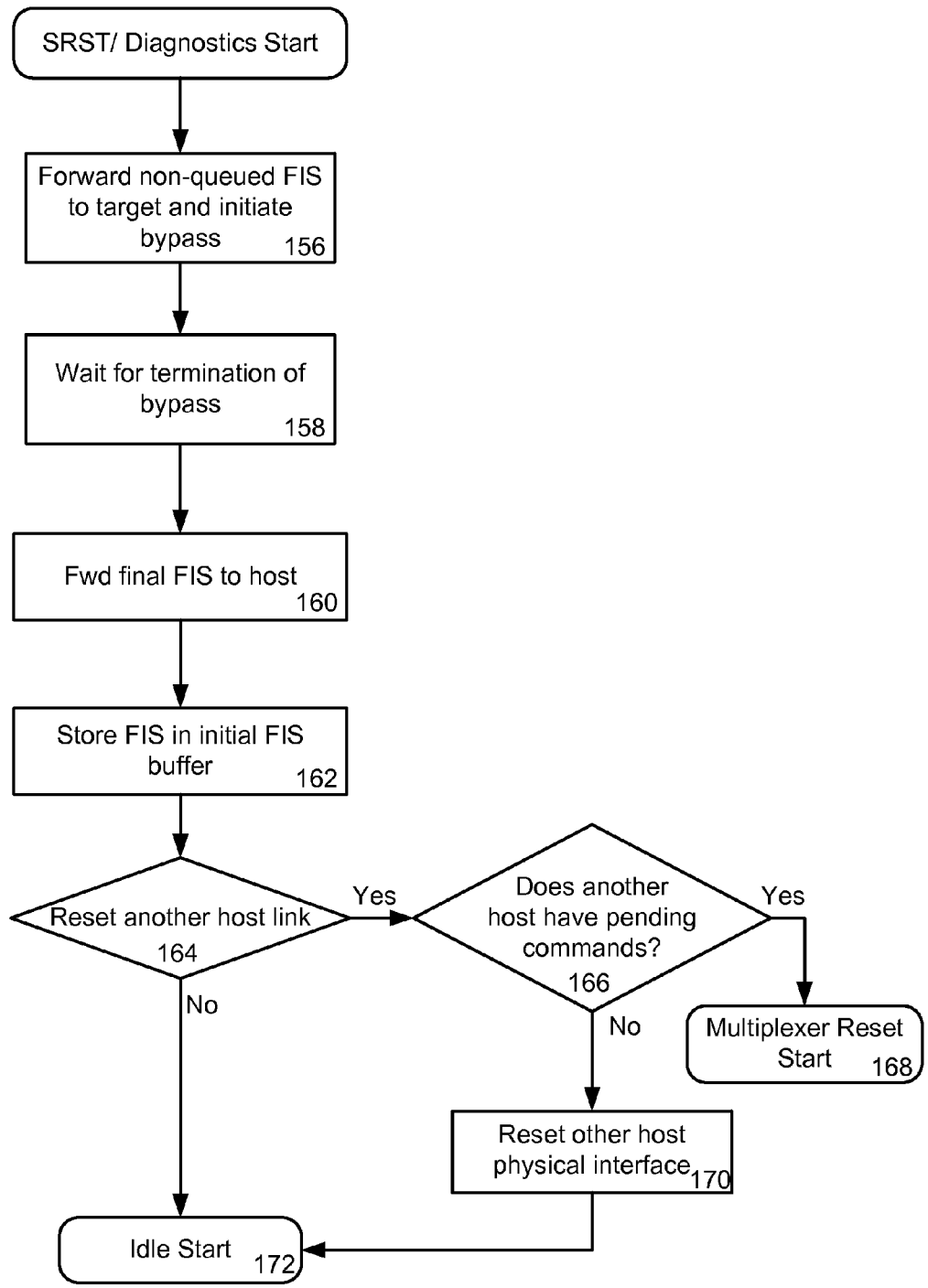
FIG. 7 is a flow chart of the processing of two non-queued commands according to an embodiment of the present invention.

FIG. 7 illustrates how two non-queued commands can be processed. In this instance, the non-queued commands are the soft reset command and the execute diagnostics command. In step 156 the FIS containing the non-queued command is forwarded to the target, and a bypass connection is established. In step 158 the process waits for the end of the bypass connection, which is typically denoted by the receipt of a D2H_REG FIS. This final FIS is forwarded to the host in step 160. Because this FIS often contains drive parameter information, it is stored in a buffer in step 162. This permits the switch to respond on behalf of the drive when interrogated for drive parameters. In step 164, a determination is made as to whether or not a reset of the link to the other host should be reset. This determination is made on the basis of whether the other host would notice the changes to the state of the drive, and on the basis of the configuration of the switch. In step 166, a determination of whether the other host has pending commands is made. If there are pending commands, a reset routine is started in step 168. If there are no pending commands, the switch resets its host interface to the other host in step 170. Following the resetting of the interface, or if it is determined in step 164 that the other host link need not be reset, the idle state is entered in step 172.

Figure 8:
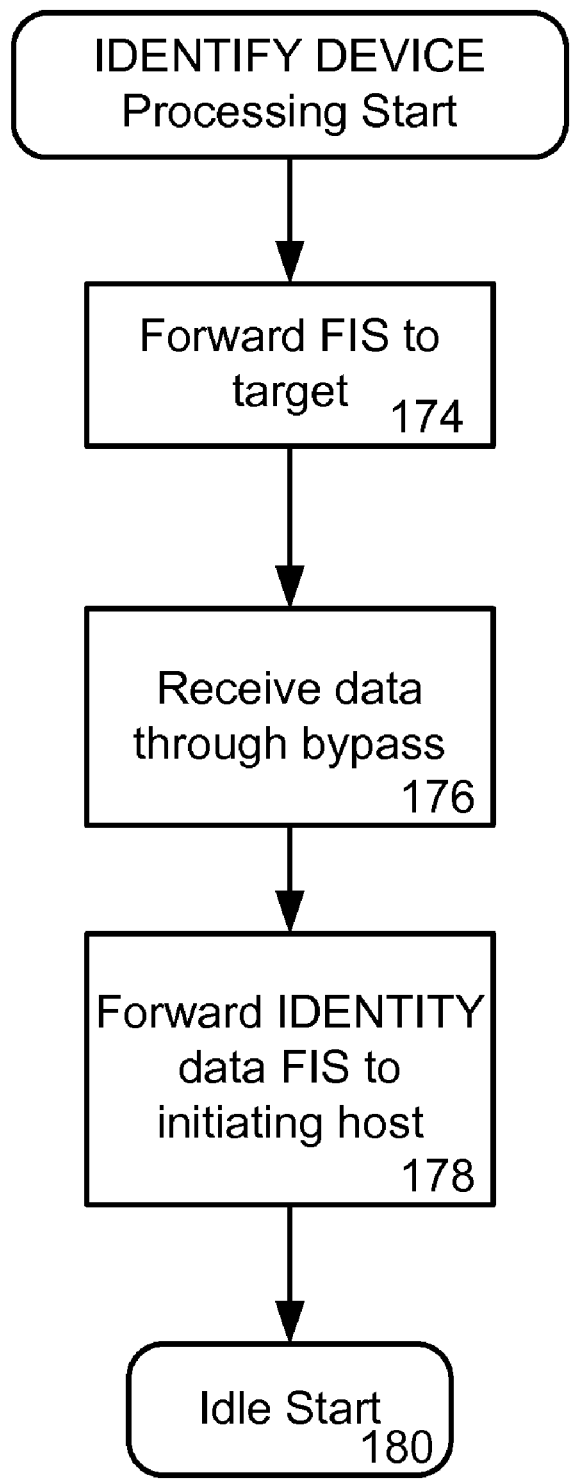
FIG. 8 is a flow chart of the processing of a recognized non-queued command according to an embodiment of the present invention.

FIG. 8 illustrates another method of handling a recognized non-queued command. In this case, the IDENTIFY_DEVICE command was recognized in step 134, and in step 174 the FIS is forwarded to the target and a bypass connection is established. The switch receives the response data in step 176. This IDENTIFY_DEVICE data is prepared as a FIS and forwarded to the initiating host in step 178. The preparation of the FIS can include modifying the data to properly reflect how the switch presents the drive to a host. Upon making these modifications, it is typically necessary to overwrite the checksum data in the frame, prior to transmitting it so that the host does not detect that the information was altered. Upon the completion of the forwarding of the identity information, the switch returns to the idle state in step 180. The transmission of the IDENTIFY_DEVICE command to the drive, and the transmission of the response to the host are treated as a single atomic sequence.

Figure 9:
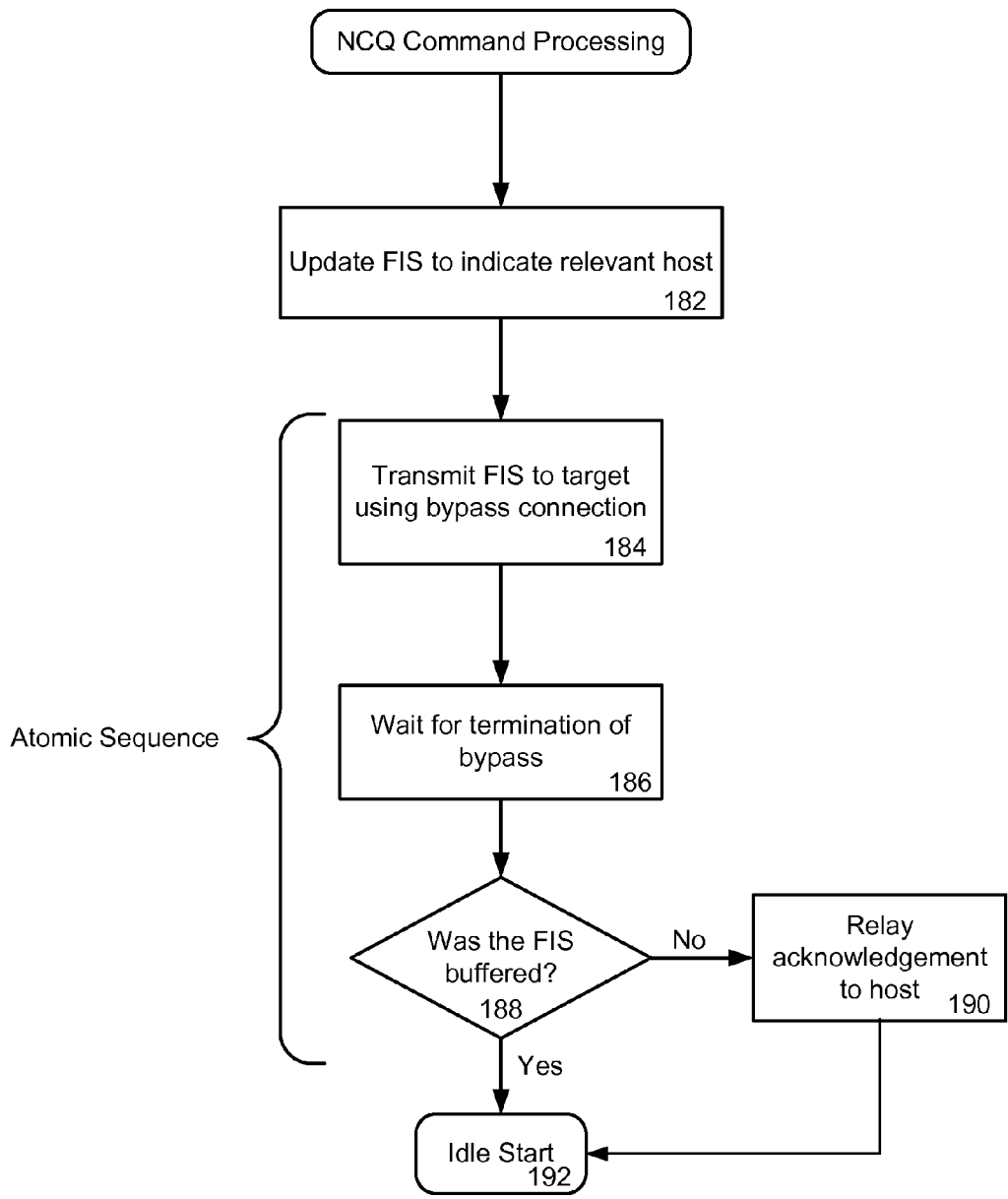
FIG. 9 is a flow chart of the processing of an NCQ command according to an embodiment of the present invention.

FIG. 9 illustrates a method of NCQ command processing, as would be called by previously illustrated methods. Upon recognition of a FIS containing an NCQ command, and determination that the NCQ command will be transmitted to the drive, the FIS containing the NCQ command is updated to reflect the originating host in step 182. This updated/modified FIS is transmitted to the target using a bypass connection in step 184. In step 186, the switch waits for the termination of the bypass connection. As noted above, the termination of the bypass connection is typically indicated by the receipt of a D2H_REG FIS indicating an error free state. In step 188 a determination is made as to whether the FIS was buffered. If the FIS was not buffered, acknowledgement of the FIS is transmitted to the host in step 190. This acknowledgement may be simply forwarding the acknowledgement from the drive. Upon either the transmission of the acknowledgement in step 190 or determination that the FIS was buffered prior to transmission in step 188, the idle state is entered. Buffered commands do not typically have to be acknowledged at this point, as they are typically acknowledged by the switch upon buffering, and providing double acknowledgement may confuse the host, as it has already been acknowledged by the virtual target.

Figure 4:
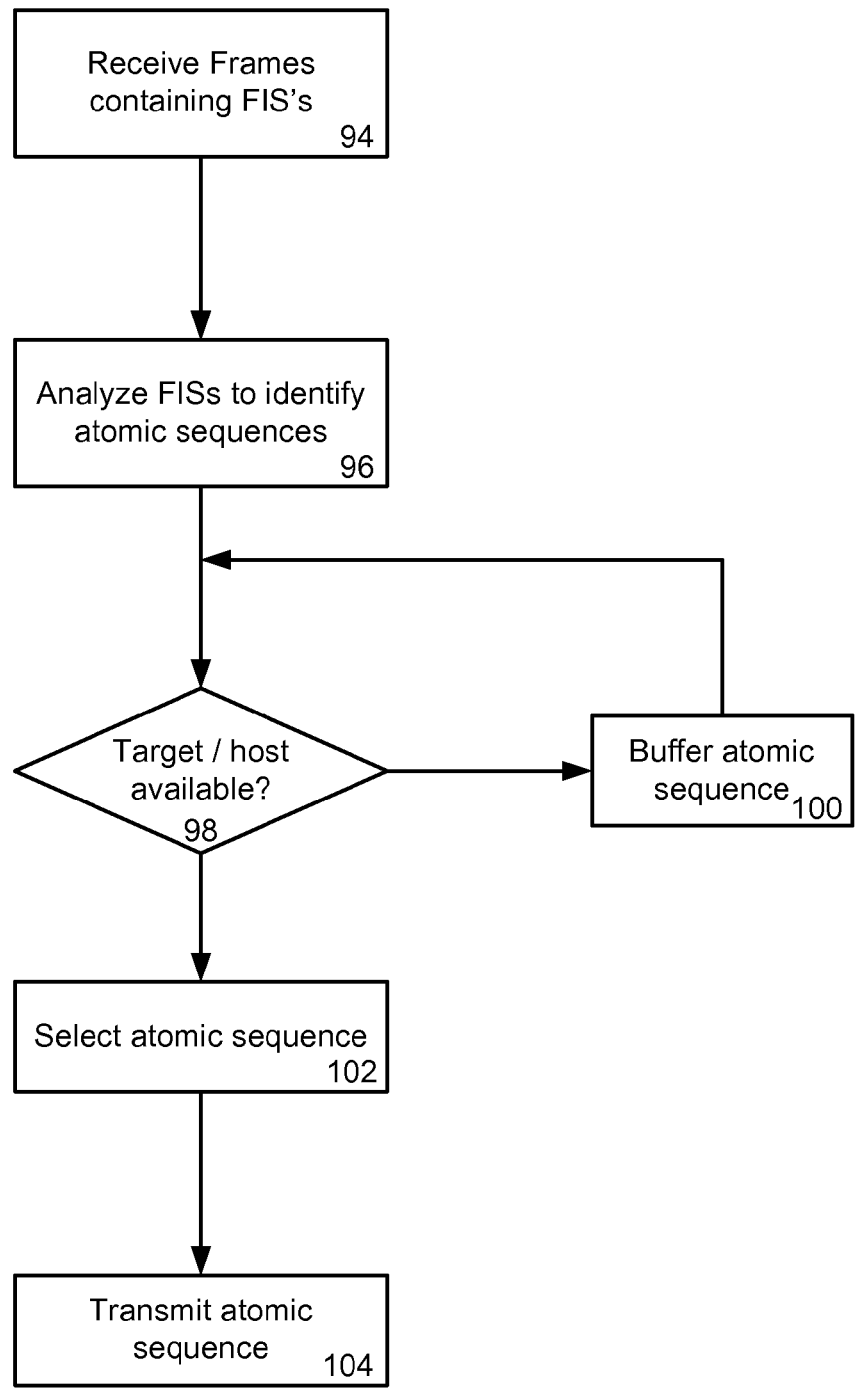
FIG. 4 is a flow chart of a command switching method according to an embodiment of the present invention.
Figure 10:
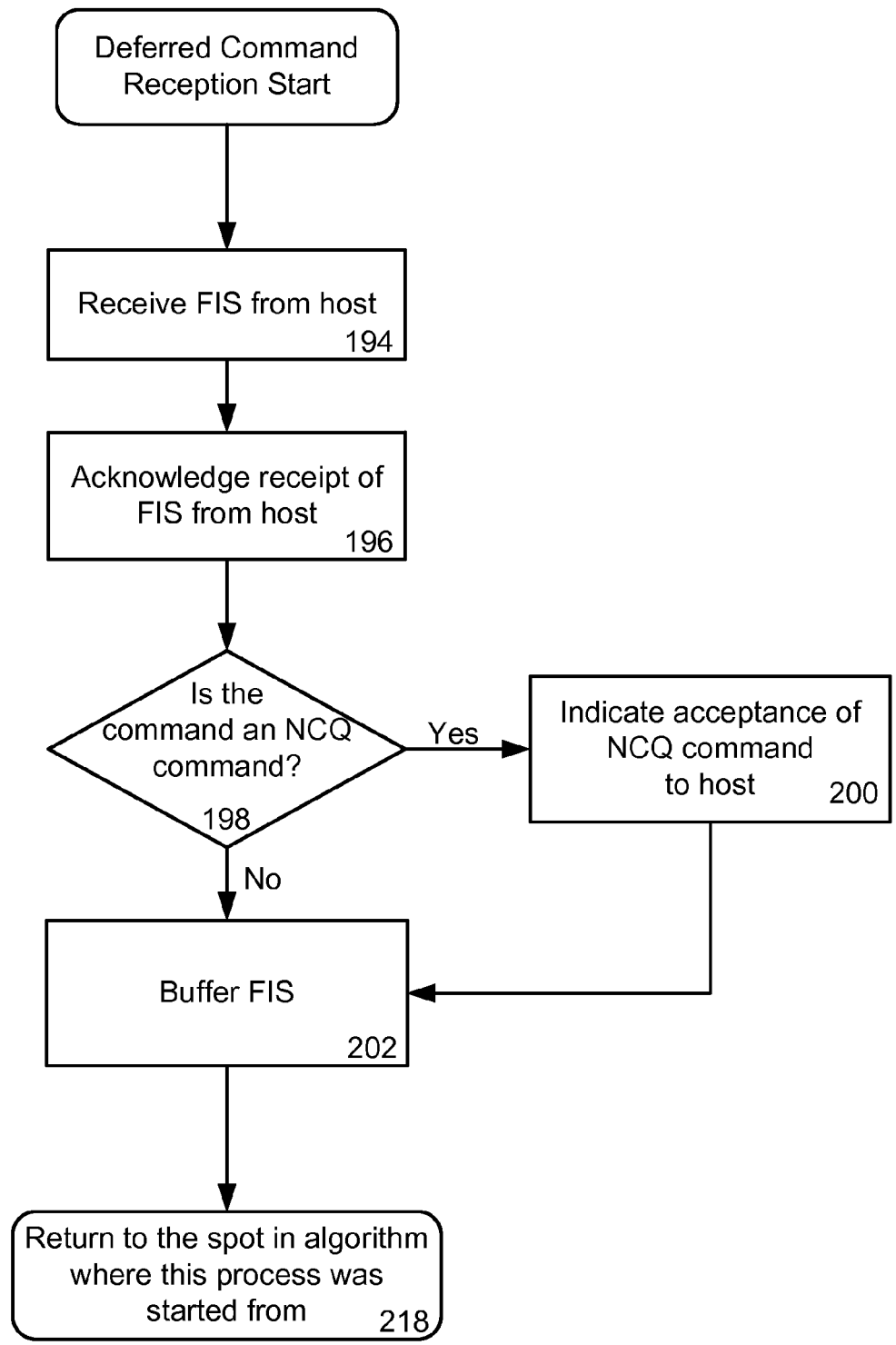
FIG. 10 is a flow chart of the processing of received and deferred commands according to an embodiment of the present invention.

FIG. 10 illustrates an exemplary method of receiving and deferring commands by buffering them. This can be used in steps 100 and 122 as illustrated in FIG. 4, and in other methods where buffering commands due to immediate unavailability of the drive is necessary or desirable. Deferred command receipt allows the switch to receive a FIS from multiple hosts while in the midst of processing an atomic sequence between other hosts and the drive. These deferred command FIS's are buffered so that they can be sent at a later time.

Figure 11:
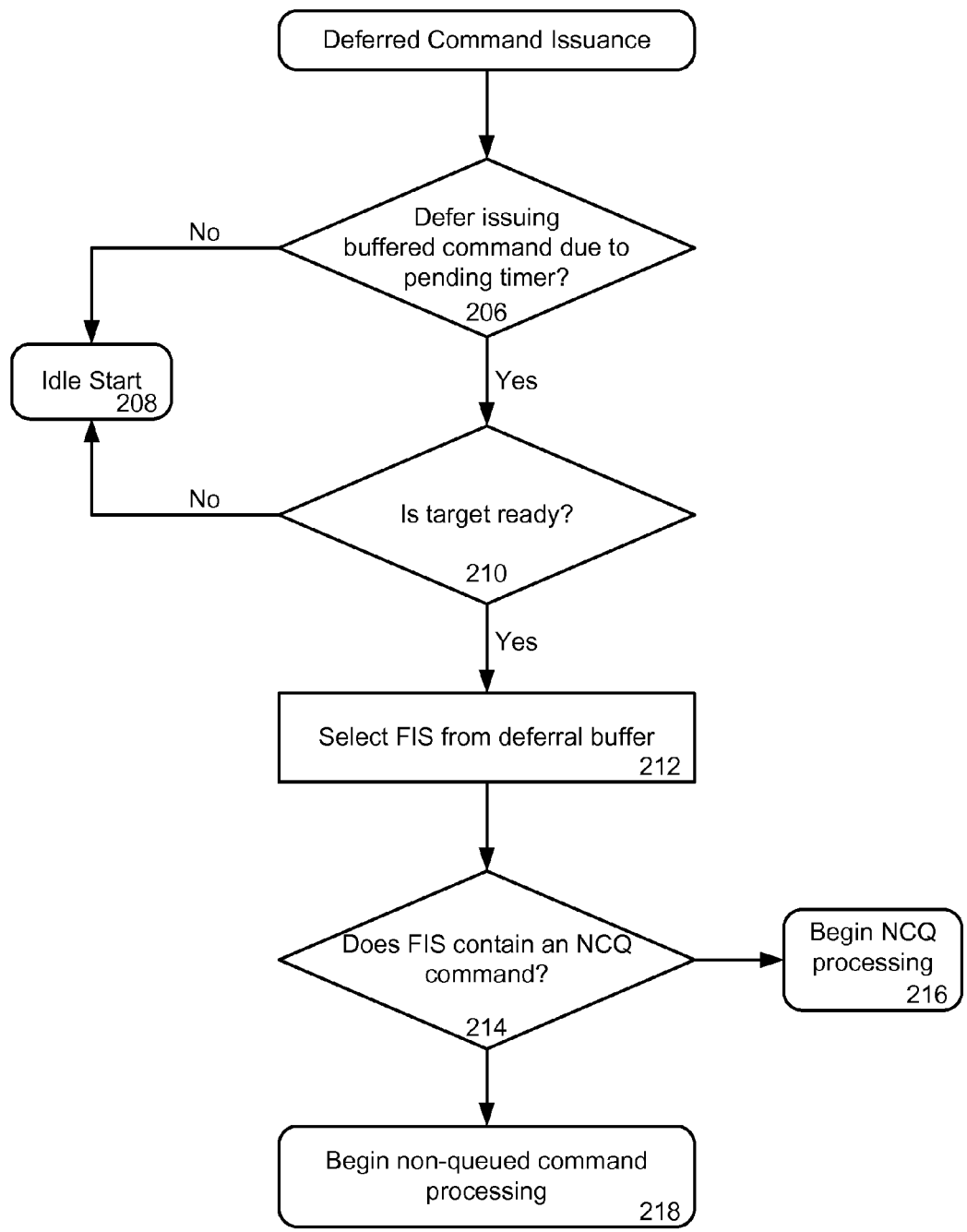
FIG. 11 is a flow chart of the processing of buffered or deferred commands according to an embodiment of the present invention.

In step 194, a FIS is received from a host. As discussed above, for one of a number of reasons, the FIS will be buffered, and transmission of the FIS to the drive will be deferred. In step 196, confirmation of the receipt of the FIS is provided to the host. Typically, this takes the form of an R_OK message. In step 198, the FIS is examined to determine if it contains an NCQ command. If the FIS contains an NCQ command, acceptance of the NCQ command is provided to the host in step 200. Because a host would usually receive a D2H_REG FIS from the drive indicating that it is neither busy nor in an error state (BSY=0 ERR=0), the switch can create and transmit the FIS to the host on behalf of the drive. Upon either determining that the FIS does not contain an NCQ command, or upon providing acknowledgement of the receipt of the NCQ command, the switch buffers the FIS in step 202, and the switch returns to the step in the process that called for deferring the command FIG. 11 illustrates the issuance of buffered or deferred commands, such as those buffered in FIG. 10. A process for issuing deferred commands can, for example, be invoked when the switch has completed an atomic sequence, and there are pending deferred commands. In step 206, a pending command timer can be inspected to determine if a deferred command can be issued. If the pending command timer was initialized in step 122 of FIG. 5, a non-queued command is waiting to be transmitted to the drive. As a result, a deferred command should not be sent, as the timer was initialized to allow the queued commands in the drive to be flushed, and any command sent will be preempted by the non-queued command. Accordingly, the method proceeds to the idle state in step 208. If the pending command timer has not been initialized, the switch checks to see if the target is ready to receive a command in step 210. This is typically done by sending a transmit ready (X_RDY) message to the drive. If the drive responds with R_RDY then it is ready to receive, otherwise it will respond with X_RDY indicating that it is about to transmit information to one of the hosts. In this case, the process returns to the idle state in step 208. If the target drive is ready to receive a command, a FIS is selected from the deferral buffer. This selection can be done on the basis of an arbitration scheme such as round-robin arbitration, or another method including unfair arbitration. In step 214, the FIS is inspected to determine if it contains an NCQ command. If the FIS contains an NCQ command, NCQ processing is begun in step 216, otherwise non-queued command processing is begun in step 218.

Thus far, attention has been addressed to how the switch 80 handles traffic arriving from the hosts destined to the drive. Traffic originating with the drive, and destined to one of the hosts will now be discussed. When a drive is ready to transmit data, it presents the switch with an X_RDY condition. The switch 80 is required to respond to the drive in such a situation, as drives are allocated the highest priority in SATA transactions. The switch 80 can determine the host to which the data is destined from, for example, a DMA_SETUP FIS or a SDB FIS received from the drive. Direct Memory Access (DMA) transfers are typically issued in response to NCQ commands. A data transfer, typically consisting of one or more NCQ commands, is parsed into atomic sequences as noted above in respect of host to drive interactions. The transfer from the drive is inspected by the FIS analyzer 88 to determine if it is requesting the establishment of a DMA transfer. The host is then notified by the switch 80 that a data transfer is about to occur, and the host is requested to respond. If this is the case, the switch 80 remaps the tags of the transmission to correspond with the destined host's view of the drive (e.g. queue length and locations) and a DMA transfer is established with a predefined transfer window length in accordance with the atomic sequence identified by the switch 80. When this window closes, the switch has completed the data transfer and can return to the idle process.

If a DMA transfer is not requested, the drive is typically providing either the response to a non-queued command or is forwarding a status message or an error message. These messages are also considered to be atomic sequences. If the transfer from the drive contains drive configuration information, this information can be buffered. The switch can provide the information to a host when it requests such information, without further interaction with the drive.

The switch of the present invention also permits graceful error recovery. The D2H_REG FIS's and specific error messages (flags or tags in the FIS) can be selectively dispatched to the affected hosts, and incoming commands from the other hosts can be queued in the virtual target command queues until the affected hosts complete the error recovery sequence. Depending on the particular error, an error indication can be dispatched to both hosts to permit both hosts to complete appropriate error recovery procedures without interference.

Error messages are identified as atomic sequences, as described above. Non-queued command errors are received by the FIS analyzer 88, and if they are relevant to only one host, they are forwarded to that host, although they might be modified prior to transmission. For example, switch configuration parameters can be used to determine the appropriate action. Depending on the switch configuration, the switch can make intelligent decisions with respect to the handling of the error message. For example, the switch can issue a reset command in response to the error. The links to the active host may be reset, or links to all hosts may be reset. Certain error messages from the target 82 may also request a soft reset, in which case, the soft reset handling described in FIG. 7 can be employed. It should be noted that a message, such as a Set Device Bit FIS, can also be forwarded to all hosts, not just the active host, if it applies equally to all. Thus, the switch of the present invention can provide graceful error handling on a per host and per virtual target basis, without interrupting communication between the other host and its virtual target.

Figure 12:
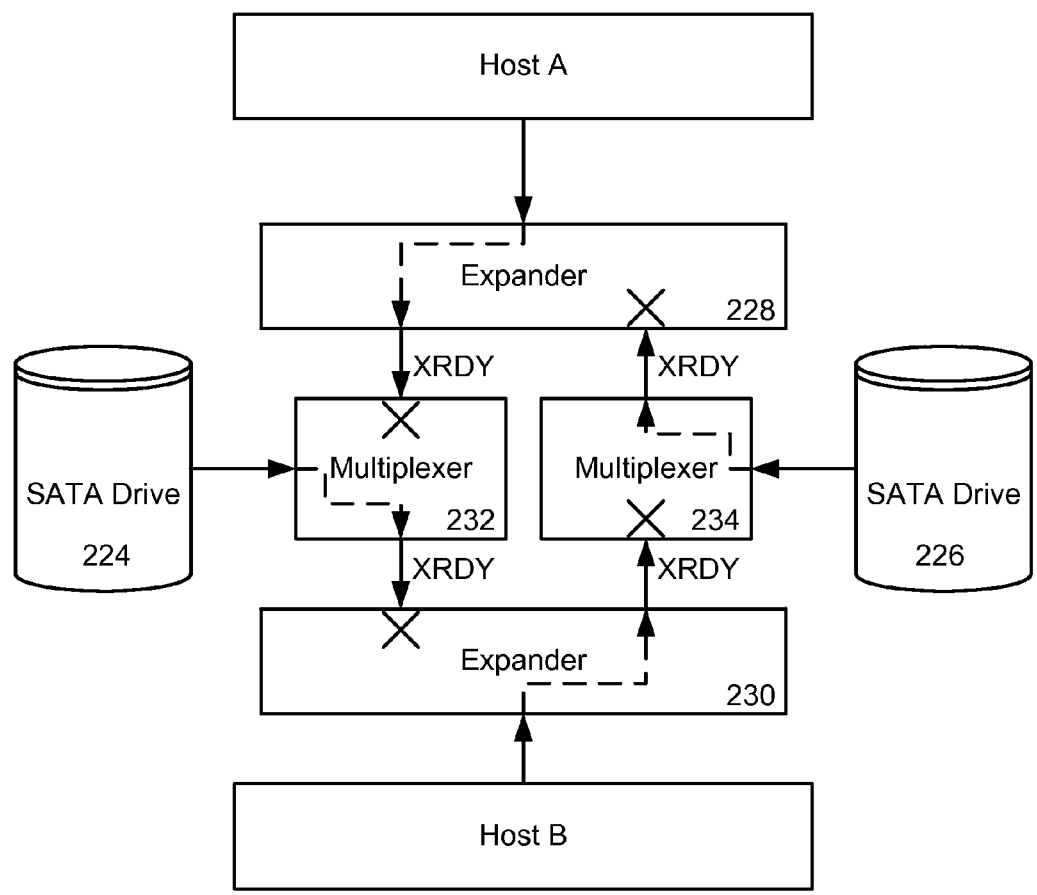
FIG. 12 is a diagram illustrating a deadlock condition.

In addition, the undesirable conditions, such as lock up or deadlock, can be avoided using the switch of the present invention. FIG. 12 illustrates a lock up condition that can occur in prior art systems without proper error handling. Host A and host B both connect to SATA drive 224 and SATA drive 226 through multiplexers and expanders. Host A connects to expander 228, which connects to both multiplexer 232 and multiplexer 234. Similarly, host B connects to expander 230, which connects to both multiplexer 232 and multiplexer 234. Multiplexer 232 provides access to SATA drive 224 and multiplexer 234 provides access to SATA drive 226. If SATA drive 226 responds to a queued, and possibly deferred, request for data from host A at the same time that SATA drive 224 responds to a queued, and possibly deferred request for data from host B, drive 224 will attempt to contact host B and drive 226 will attempt to contact host A. If host A then issues a command to SATA drive 224, and host B issues a command to SATA drive 226, multiplexers 232 and 234 will encounter a deadlock condition. The deadlock is characterized by a plurality of host connections, where each host connection is attempting to send data to one drive while another drive is attempting to transmit data to it. One skilled in the art will appreciate that switch 80 can make use of deferred command processing, as described above, to avoid deadlock. The ability to intelligently receive, defer and buffer a command from multiple hosts while transmitting to another host allows the transmitting host to complete its STP connection in a SAS topology. By allowing the hosts to complete outgoing STP transactions by queuing and deferring commands, switch 80 allows one host to free the connection through the expander and then allows the other drive to forward its data. Thus, queued and deferred commands allow the avoidance of deadlock.

The SATA switch of the present invention supports two programmable timers to guard against link layer and command layer protocol lockups. A link watchdog timer, having a configurable countdown interval, can be started at the beginning of every link layer transaction. If a link layer transaction does not complete before the link watchdog timer expires then it can be assumed that a lockup has occurred and a SATA switch reset can be performed.

A bypass watchdog timer, also having a configurable countdown interval, is started at the beginning of every atomic sequence. If the end of an atomic sequence is not detected before the bypass watchdog timer expires then it can be assumed that a lockup has occurred or that synchronization with the attached devices has been lost and a SATA reset can be performed.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

In the preceding description, for purposes of explanation, numerous details are set forth in order to provide a thorough understanding of the embodiments of the present invention. However, it will be apparent to one skilled in the art that these specific details are not required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of providing transparent access to a target device to each of a plurality of hosts, the method comprising:
   emulating the target device as a plurality of independent virtual targets each having an associated logical construct;
   associating each of the plurality of host devices with a respective one of the plurality of independent virtual targets;
   receiving requests for access to the target device from the plurality of host devices;
   analyzing requests from each of the plurality of hosts to determine atomic sequences contained therein, each atomic sequence defining an indivisible logical operation destined to a respective one of the plurality of virtual targets;
   modifying the atomic sequences in accordance with the logical construct of their respective virtual targets to provide modified atomic sequences;
   maintaining, for each of the plurality of independent virtual targets, an independent frame buffer storing frames received from its respective host device, an independent command queue storing the modified atomic sequences destined to the respective one of the plurality of virtual targets, and an independent context database storing a context of the respective one of the plurality of virtual targets; and
   interleaving the modified atomic sequences from the plurality of hosts to provide substantially simultaneous access to the target device to each of the plurality of host devices.

2. The method of claim 1 wherein the target device is a storage device.

3. The method of claim 1 wherein the target device is a Serial ATA (SATA)-compliant device.

4. The method of claim 3, wherein the plurality of independent virtual targets are SATA-compliant devices.

5. The method of claim 3, wherein the plurality of independent virtual targets are SAS (Serial Attached SCSI) STP (SATA Tunneled Protocol)-compliant devices.

6. The method of claim 1 further comprising:
   detecting a boundary of a modified atomic sequence that defines the indivisible logical operation destined to one of the plurality of independent virtual targets;
   selecting the one of the plurality of independent virtual targets to access.

7. The method of claim 6 further including transmitting the modified atomic sequence to the one of the plurality of independent virtual targets.

8. The method of claim 7 further including determining whether the one of the plurality of independent virtual targets is ready to receive prior to transmitting the modified atomic sequence to the one of the plurality of independent virtual targets.

9. The method of claim 8 further including deferring the transmission of the modified atomic sequence until the one of the plurality of independent virtual targets is ready to receive.

10. The method of claim 7 further including detecting the end of the modified atomic sequence.

11. The method of claim 10 wherein detecting the end of the modified atomic sequence includes receiving an indication from the one of the plurality of independent virtual targets.

12. The method of claim 11 wherein receiving the indication from the one of the plurality of independent virtual targets includes receiving a drive to host register Frame Information Structure (FIS).

13. The method of claim 1 wherein the interleaving permits graceful recovery from error states.

14. The method of claim 1 wherein the interleaving permits avoidance of deadlock.

15. The method of claim 1 wherein the atomic sequence comprises at least one FIS to invoke a command, transfer of status, or exchange of data.

16. The method of claim 1 wherein the atomic sequence defines a non-queued command operation.

17. The method of claim 16 further including waiting a predetermined interval prior to transmitting the modified atomic sequence.

18. The method of claim 17 wherein the predetermined interval is determined in accordance with a time required to flush queued commands from the one of the plurality of independent virtual targets.

19. The method of claim 6 wherein the atomic sequence defines a Native Command Queuing (NCQ) operation.

20. The method of claim 19 wherein maintaining independent command queues includes logically partitioning target device command queues into command queues associated with each of the plurality of independent virtual targets.

21. The method of claim 1 wherein modifying includes modifying a FIS associated with the atomic sequence to indicate the originating host.

22. The method of claim 1 wherein modifying includes modifying a SATA H2D_REG FIS to indicate command issuance.

23. The method of claim 1 wherein modifying includes modifying a SATA DMA_SETUP FIS for reverse tag mapping.

24. The method of claim 1 wherein modifying includes modifying a SATA SDB FIS for completion indication.

25. The method of claim 1 wherein modifying includes modifying a SATA D2H_REG FIS for error indication.

26. The method of claim 1 wherein modifying includes modifying a SATA DATA FIS.

27. The method of claim 26 wherein the SATA DATA FIS is an IDENTIFY_DEVICE response DATA FIS.

28. The method of claim 26 wherein the SATA DATA FIS is a READ_LOG_EXT response DATA FIS.

29. A multi-ported switch, comprising:
a plurality of host interfaces for receiving frames destined to a target device from a respective plurality of hosts, the target devices being emulated as a plurality of virtual targets, each of the plurality of virtual targets being associated with a respective one of the plurality of hosts and each having an associated logical construct;
a processor including a Frame Information Structure (FIS) analyzer detecting FIS's within the frames, each FIS containing at least one SATA command, an atomic sequence detector identifying atomic sequences, each atomic sequence comprising a set of SATA commands invoking a single logical operation between one of the hosts and the target device, means to modify the atomic sequences in accordance with the logical construct of their respective virtual targets to provide modified atomic sequences, and means to arbitrate selection of the modified atomic sequences for transmission to the plurality of virtual targets, the means to arbitrate selection of the modified atomic sequences configured such that atomic sequences from the plurality of hosts are interleaved, thereby providing substantially concurrent communication between the plurality of hosts and the target device;
a memory, including a buffer storing the identified atomic sequences; and
a SATA target interface to transmit the selected atomic sequences to the plurality of virtual targets in the order arbitrated.

30. The switch of claim 29, wherein the arbitration is a round-robin arbitration among the plurality of hosts.

31. The switch of claim 29, wherein the processor includes means to determine that the SATA target interface is in a condition ready to receive a FIS.

32. The switch of claim 29 further including a link watchdog timer to monitor the link layer transaction completion.

33. The switch of claim 29 further including a bypass watchdog timer to monitor atomic sequence completion.

34. A method of command switching, comprising steps of:
receiving frames from a plurality of hosts, and destined to serial ATA (SATA) target device in a serial-attached SCSI (SAS) topology, the frames each including a Frame Information Structure (FIS) having at least one command stored therein, the target device being emulated as a plurality of virtual targets, each of the plurality of virtual targets being associated with a respective one of the plurality of hosts and each having an associated logical construct;
analyzing each FIS to identify atomic sequences, each atomic sequence comprising commands to invoke an indivisible logical operation between one of the plurality of hosts and the target device;
modifying the atomic sequences in accordance with the logical construct of their respective virtual targets to provide modified atomic sequences;
selecting modified atomic sequences for transmission to the virtual targets associated with the target device, the selection being arbitrated such that atomic sequences from the plurality of hosts are interleaved, thereby providing substantially concurrent communication between the plurality of hosts and the target device; and
transmitting the selected atomic sequences to the plurality of virtual targets in the order arbitrated.

35. The method of claim 34 wherein the step of analyzing each FIS to identify atomic sequences includes transmitting a selected atomic sequence to the its respective virtual target and determining that the atomic sequence is complete upon receipt of an indication from the virtual target.

36. The method of claim 34 wherein selecting one of the atomic sequences includes identifying a FIS associated with the selected atomic sequence as a non-queued command.

37. The method of claim 36 further including waiting for a predetermined interval prior to transmitting the selected atomic sequences.

38. The method of claim 37 wherein the predetermined interval is determined in accordance with a time required to flush a respective virtual target of queued commands.

39. The method of claim 34 wherein transmitting a selected atomic sequence includes modifying a FIS associated with the selected atomic sequence to indicate its respective originating host.

* * * * *

UNITED STATES PATENT AND TRADEMARK OFFICE
CERTIFICATE OF CORRECTION

| | | |
|---|---|---|
| PATENT NO. | : 7,739,432 B1 | Page 1 of 1 |
| APPLICATION NO. | : 11/470078 | |
| DATED | : June 15, 2010 | |
| INVENTOR(S) | : Keith Shaw et al. | |

It is certified that error appears in the above-identified patent and that said Letters Patent is hereby corrected as shown below:

On the Title Page, Item (75)
The cover page, under the section titled "Inventors", delete "Nicolas" and insert therefor -- Nicholas --

Signed and Sealed this

Seventeenth Day of August, 2010

David J. Kappos
*Director of the United States Patent and Trademark Office*